Figure 1:
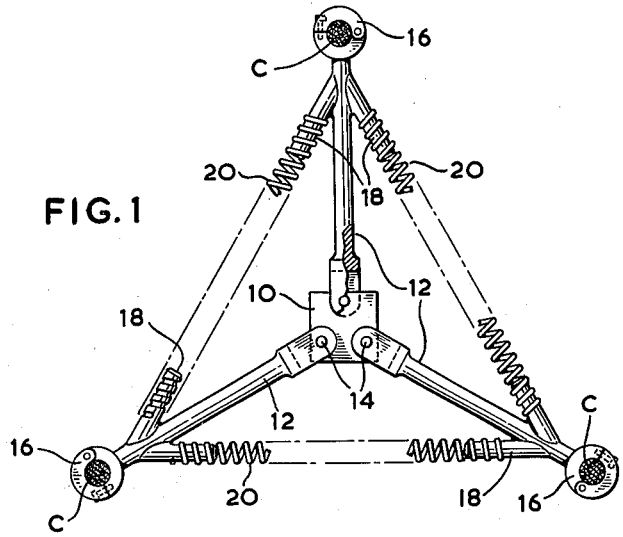

Jan. 18, 1966     H. D. SHORT     3,230,295

SPRING LOADED SPACER-DAMPER

Filed May 25, 1964

INVENTOR.
H. DOUGLASS SHORT

BY *Featherstonhaugh & Co.*

ATTORNEYS

United States Patent Office 3,230,295
Patented Jan. 18, 1966

3,230,295
SPRING LOADED SPACER-DAMPER
Herbert Douglass Short, Newmarket, Ontario, Canada, assignor to Line and Cable Accessories Limited, Newmarket, Ontario, Canada
Filed May 25, 1964, Ser. No. 369,884
4 Claims. (Cl. 174—42)

This invention relates to a device for spacing a plurality of conductors, for damping the vibrations in the individual conductors, and ameliorating the angular rotation of the group of conductors about their centroid.

Where a number of conductors for electric power are located adjacent one another and extending in the same direction, it is desirable to maintain such conductors in a predetermined spatial relationship to one another by spacers. Heretofore, such spacers have generally comprised rigid members for supporting clamping attachments to the conductors with the rigid member designed to maintain the conductors in their desired spatial arrangement. Some such arrangements have means for damping high frequency aeolian vibrations in the conductors said damping means being elements of synthetic rubber displaced between the clamping attachment and the rigid members thereby obviating a metal-to-metal contact between the conductor and the rigid member.

These prior arrangements for spacing a plurality of conductors and for damping high frequency aeolian vibration therein, are expensive to provide and install. Moreover, the plurality of conductors, rigidly spaced with respect to one another, tend to twist as a unit resulting in entanglement and consequent faults. Further high frequency aeolian vibration damping, although achieved to some extent with the aforesaid arrangements, is not satisfactory, since the synthetic rubber washers introduce an electrical capacitance between the individual conductors and the rigid member such that under certain conditions charging currents can flow or electrical discharges can be initiated which are harmful to the electrical performance of the device. Also the rigid spacer design is inflexible so that if the number of conductors or the arrangement thereof is altered, then a complete new spacer must be provided. In addition, the inflexibility of the rigid spacer design can result in serious and permanent distortion of the conductors when subjected to the attractive or repelling forces caused by excessive currents flowing in the conductors such as would happen under electrical fault conditions.

This invention provides a spacer using diverging swingably connected arms with means for connection of the arms, one to each of the conductors which it is desired to space, such arms being biased to their desired orientation with respect to one another (therefore biasing said conductors toward the desired spatial relationship) by springs connected to said arms at locations spaced from their swingable mounting, said springs being designed and connected at their other ends to members (which may be other swingable members) in such a way that said arms are balanced by the spring forces applied to an arm about its swingable mounting to maintain said arms in the desired relative orientations.

By the inventive method, a spacer is provided which, because of the resilient spring control of the arms, acts as a very efficient aeolian vibration damper. The cost of such member is much less than that of the prior elements discussed above. Moreover, the damping which is provided by the springs connected to the arms allows aeolian vibrations to be damped more effectively than with prior arrangements. The fact that vibration in a wire is damped by a decreasing complex periodic movement relative to other wires, considerably reduces the tendency of the conductors, as a group, to vibrate which is enhanced by the resilient spring control. Additionally, the resilient spring control imparts to the device a sufficient measure of restoring torque to overcome the tendency of the plurality of spaced conductors to twist and consequently become entangled in service. Also it has been found that the inventive device with the spring-loaded arms, prevents distortion of the conductors caused by the attractive or repelling forces imposed by fault currents to a greater degree than with prior devices. The use of swingably mounted arms moreover allows the design of the inventive spacers to allow for the addition or subtraction of arms, whereby the inventive spacer may easily be redesigned for use with larger or smaller numbers of conductors.

In a preferred form of the invention there is provided a spacer having a plurality of arms each of which is swingably connected to others of said arms. For two or three conductors, there must be at least three arms to achieve the required balance by the springs of such arms. If more than three conductors are used then preferably there will be provided an arm for each of said conductors. Means are provided so that those arms which are to be attached to conductors may be so attached. Springs join angularly adjacent ones of such arms being connected thereto at locations spaced from the swingable mountings thereof and the springs are designed and arranged to balance the arms in the desired orientation to achieve the desired conductor location.

By this means the advantages referred to above are achieved.

In most cases, the invention will be used with a plurality of grouped conductors all carrying the same phase (whether the power is single phase, three phase or otherwise). If all conductors contacted by a spacer are of the same phase, then the spacer attachment means, the arms and preferably the springs, will all be electrically connected and arranged to connect the conductors one to another and this has been found to be advantageous. Naturally if some of the conductors carry different phases the spacer will be designed to insulate different phases from each other.

Figure 2:
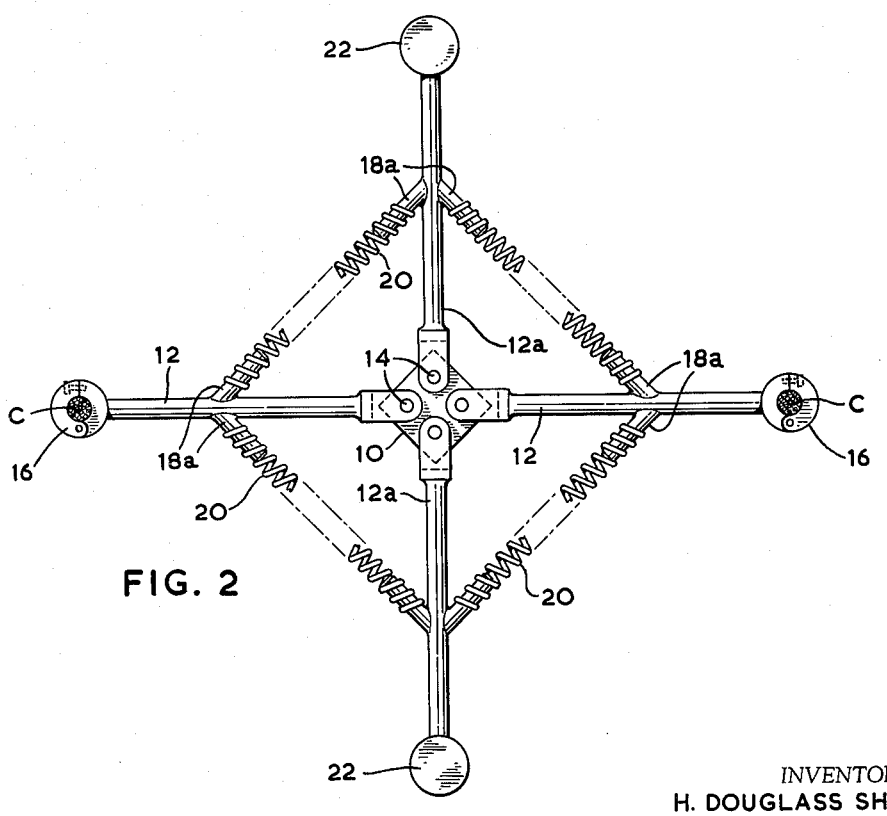

In drawings which illustrate preferred forms of the invention:

FIGURE 1 shows the inventive construction for three conductors all of a single phase; and FIGURE 2 shows the inventive construction for two conductors both of a single phase.

In FIGURE 1 is shown a spacer for use with three conductors C grouped in a triangle when viewed in a plane transverse to their direction and wherein the three conductors are all carrying the same phase. The device comprises a central element 10 to which three arms 12 are swingably and preferably pivotally connected, as shown, at 14. The pivotal attachment is preferably provided by split ears on the inner end of the arm having a bore therethrough which co-operates with a bore in central element 10 to which the split ears are connected by a bolt passing through the aligned bores and held in place by any desired means. The ends of the arms are provided with attachment and preferably clamping means 16 which may be of any well known design for clamping to the respective conductors. On each side of the arm and diverging in a direction looking inwardly along the arm are bosses 18 spirally threaded to receive the spiral spring 20 which joins the adjacent bosses 18 of angularly adjacent arms. The bosses are directed so that with the springs in the straight position, the arms 12 will diverge at 120° to one another; that is, symmetrically from the central element 10 relative to one another. The springs 20 may be attached to the threading in any desired manner, but one way in which this may be done is by screwing the spring on one of the opposed bosses 18 and attaching the other end of the spring 20 to the other opposed boss 18 by applying torque to the spring 20 in the opposite sense to that in which it would be screwed on, then applying the spring 20 to the threading and allowing the spring 20 to twist onto the threading on the release of the twisting pressure. In this way the three arms may be biased to an orientation at 120° to one another, each with the springs 20 connecting to arms 12 at locations spaced from the swingable connection and the springs 20 are designed to balance the three arms at the 120° relationship to one another. Thus conductors C clamped respectively to the clamps 16 on the end of the three arms will be biased by the spring balancing in an equilateral triangle by the balanced springs. On the other hand, if vibration or stress occurs in one of the conductors C, this is absorbed in part by the springs which connect the arm to which the conductor is clamped, to the other conductors and by other springs 20 in turn affected thereby and in part by angular rotation or twist of the vibrating conductor by the motion of the inventive device in space occasioned by the resilient coupling of the several springs. Also, because of the characteristics of the springs and the inherent angular restoring torque thereby imparted the tendency of the conductors to unduly twist, as a group, is avoided. Distortion of the conductor C during fault currents is reduced and a construction much cheaper than previously used, is provided.

In FIGURE 2 is shown similar construction for use with two conductors C and it will be noted that although two conductors are connected to arms 12, that the proper balancing of the springs is achieved by providing two extra arms 12a which extend in opposed directions and at 90° to the arms to which conductors are attached. The bosses 18a on the arms are set to project at an angle of 45° to the arm 12 whereby the springs 20 when straight extend at 45° to the respective arms and four are provided connecting the four arms, each to those arms angularly adjacent. At the end of the arms which do not connect the conductors there is preferably provided counterbalance weights 22 as shown.

Referring again to FIGURE 1, it will be obvious that the invention lends itself to addition or subtraction of conductors since if four conductors are to be provided then the arms shown would be replaced by four arms which could be simply attached to the central member with a spring arrangement as shown in FIGURE 2, but with conductors clamped at the end of each of the arms 12a as well as 12. Similarly, five or more conductors could be spaced in an analogous way.

In the most likely use of the invention, all the conductors will be carrying the same phase, and hence it is possible and in fact advantageous that the spacer connect the three or more conductors electrically, hence the clamps will be electrically connected to the conductors, and the clamps, arms, central element and preferably the springs will all be electrically conducting, so that electrical potential may freely adjust between the members.

It will also be noted that the arms, instead of being swingably connected together through a central member might be swingably connected to each other.

Modifications to the embodiment illustrated will be apparent to those skilled in the art. The connections 14 for example, can conveniently be made through a pair of Belleville conical disk spring washers which will permit limited movement of the conductors relative to each other axially of themselves as the arm connections to the plate 10 flex. Other modifications will be apparent.

What I claim as my invention is:

1. A spacer damper for a plurality of electrical conductors comprising a central member, at least three arms each swingably connected to said central member at one of their ends and each having clamping means for attaching a conductor at their other end, a resilient means joining each pair of angularly adjacent arms to mutually resiliently couple all of said resilient means together and to bias said arms with their ends having means for attaching a conductor in conductor spacing arrangement.

2. A spacer damper as claimed in claim 1 in which said clamping means for attaching a conductor on each of said arms are electrically connected each to each other.

3. A spacer damper for a plurality of electrical conductors comprising a central member, at least three arms each pivotally connected to said central member at one of their ends and each having clamping means for attaching a conductor at their other end, a resilient means joining each pair of angularly adjacent arms to mutually resiliently couple all of said resilient means together and to bias said arms with their ends having means for attaching a conductor in conductor spacing arrangement.

4. A spacer damper as claimed in claim 3 in which said clamping means for attaching a conductor on each of said arms are electrically connected each to each other.

References Cited by the Examiner

UNITED STATES PATENTS 3,121,770   2/1964   Dallye _____ 174—146 X

FOREIGN PATENTS 543,578   2/1932   Germany.

OTHER REFERENCES

Buckner, German Application No. 1,069,249, pub. Nov. 19, 1959.

Mors, German Application No. 1,016,337, pub. Sept. 26, 1957.

LARAMIE E. ASKIN, *Primary Examiner.*